Figure 1:
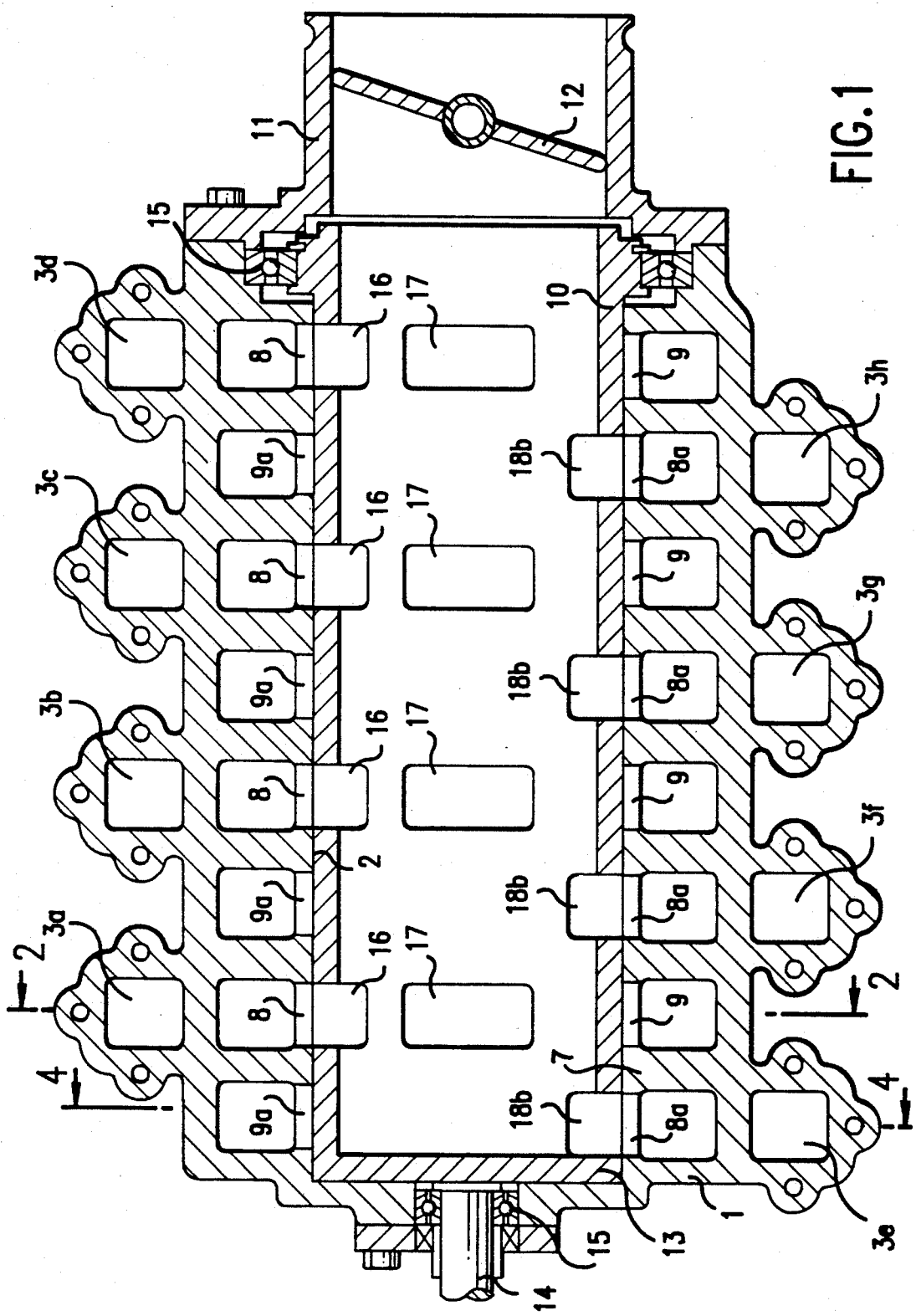

United States Patent [19]

Müller et al.

[11] Patent Number: 5,156,117
[45] Date of Patent: Oct. 20, 1992

[54] SUCTION PIPE ARRANGEMENT FOR A MULTICYLINDER INTERNAL COMBUSTION ENGINE WITH TWO BANKS OF CYLINDERS IN V FORMATION

[75] Inventors: Robert Müller, Erlenbach; Richard Clos, Oberstenfeld, both of Fed. Rep. of Germany

[73] Assignee: Audi A.G., Ingolstadt, Fed. Rep. of Germany

[21] Appl. No.: 784,425
[22] PCT Filed: Jun. 21, 1990
[86] PCT No.: PCT/EP90/00987
§ 371 Date: Nov. 7, 1991
§ 102(e) Date: Nov. 7, 1991
[87] PCT Pub. No.: WO91/00419
PCT Pub. Date: Jan. 10, 1991

[30] Foreign Application Priority Data

Jun. 28, 1989 [DE] Fed. Rep. of Germany ....... 3921081

[51] Int. Cl.[5] ............................................. F02M 35/10
[52] U.S. Cl. ................................................ 123/52 MV
[58] Field of Search ......... 123/52 M, 52 MB, 52 MC, 123/52 MV

[56] References Cited

U.S. PATENT DOCUMENTS 4,440,120  4/1984  Butler .......................... 123/52 MV
5,080,051  1/1992  Hitomi et al. ................. 123/52 ML

FOREIGN PATENT DOCUMENTS 0177794  4/1986  European Pat. Off. .
0215628  3/1987  European Pat. Off. .
61-187519  1/1987  Japan .

*Primary Examiner*—David A. Okonsky
*Attorney, Agent, or Firm*—Kane, Dalsimer, Sullivan, Kurucz, Levy, Eisele and Richard

[57] ABSTRACT

A suction pipe arrangement for a multicylinder internal combustion engine with two banks of cylinders in V formation has cylindrical intake manifold chamber (2), from which first individual suction pipes (3a to 3d) extend to the first bank of cylinders A and second individual suction pipes (3e to 3h) extend to the second bank of cylinders B. The first individual suction pipes run clockwise and the second individual suction pipes run counterclockwise around the intake manifold chamber and communicate with the latter via first and second openings (8, 9) and (8a, 9a) spaced apart at a given angle. These openings are controlled by a rotary slide valve (10) arranged in the intake manifold chamber. The rotary slide valve has a control slit (16) or (17) for each opening (8 and 9) and a common control slit (18a, 18b), subdivided by a cross member (19), for the openings (8a, 9a). In order to obtain a long swing pipe length, the second openings (9, 9a) are closed in the first position of the rotary slide valve. In order to achieve a short swing pipe length, the rotary slide valve is rotated into its second position, in which the second openings (9, 9a) are freed, but the first openings (8, 8a) also remain partly open.

3 Claims, 3 Drawing Sheets

SUCTION PIPE ARRANGEMENT FOR A MULTICYLINDER INTERNAL COMBUSTION ENGINE WITH TWO BANKS OF CYLINDERS IN V FORMATION

The invention relates to a suction pipe arrangement for a multicylinder internal combustion engine with two banks of cylinders in V formation, corresponding to the introductory portion of claim 1.

In a known suction pipe arrangement of this type (European-A 0 201 180), a valve element in the form of a flap is provided for each of the second openings. This flap is disposed on a shaft, which is used by all the flaps and extends in the longitudinal direction through the intake manifold. Particularly in the case of an internal combustion engine with a plurality of cylinders, such as 6-, 8- or 12-cylinder internal combustion engines, providing each of the second openings of each individual suction pipe with its own valve element, results in a very large number of valve flaps, which must be synchronized with one another and which, moreover, because of the oscillations arising in the intake system, tend to chatter.

For internal combustion engines with one bank of cylinders, the construction of the intake manifold chamber with a circular cross section and the providing of a rotary slide valve in this intake manifold chamber with one outlet opening per individual suction pipe is known (German Auslegeschrift 34 33 653). By rotating the rotary slide valve, the length of the swing pipe can be changed continuously. This arrangement cannot be used for an internal combustion engine with two banks of cylinders in V formation, because the individual suction pipes for the one bank of cylinders extends in the clockwise direction about the intake manifold chamber and that for the other bank of cylinders extends in the opposite direction, so that, upon rotating the rotary slide valve, the swing pipe length of the one individual suction pipes would be lengthened and that of the other individual suction pipes would be shortened. Of course, this problem does not exist if the flaps are controlled as in EP-A 0 201 180.

It is an object of the invention, to provide a suction pipe arrangement of the type, in which the second openings of the individual suction pipes are controlled with significantly less effort than in the construction of EP-A 0 2091 180, from which the invention starts out.

Pursuant to the invention, this objective is accomplished by the features given in the characterizing clause of claim 1.

Due to the asymmetric disposal and construction of the control slits (two slits for the openings of each first individual suction pipe, one longer slit for the openings of each second individual suction pipe), it is possible to control the second openings of all individual suction pipes from a single valve element, namely the rotary slide valve. Not only is the structural expense reduced considerably by these means in comparison to the state of the art, but an identical control system for all second openings is automatically ensured. Aside from these structural advantages, a higher delivery rate is achieved in this operating range and a cross sectional constriction is avoided owing to the fact that the first openings are not closed completely when the rotary slide valve is switched over from its first to its second position.

The control slit for controlling the openings of the second individual suction pipe is relatively long. Therefore, particularly for strength reasons, it may be advisable to divide this slit by means of a cross member into two partial slits, this cross member being arranged so that one of the partial slits corresponds to the size of the second opening. It is another function of the cross member to optimize by the shape of its cross section the flow from the distribution manifold into the second opening.

The control slit, which acts together with the two openings of the first individual suction pipe, can also be divided by a cross member in order to achieve higher strength. For this purpose, the position of the cross member is selected so that the still free cross section for controlling the first opening is not reduced. The inflow from the distributor manifold into the first opening is optimized by appropriately shaping the cross section of the cross member.

Figure 2:
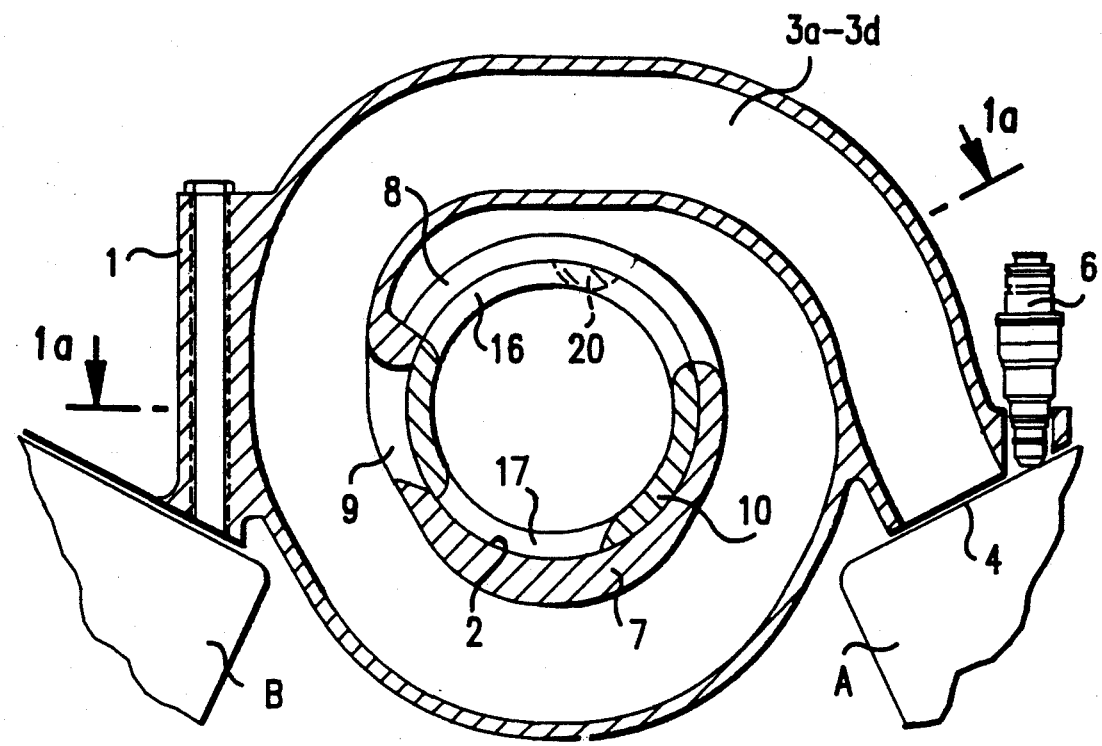
Figure 3:
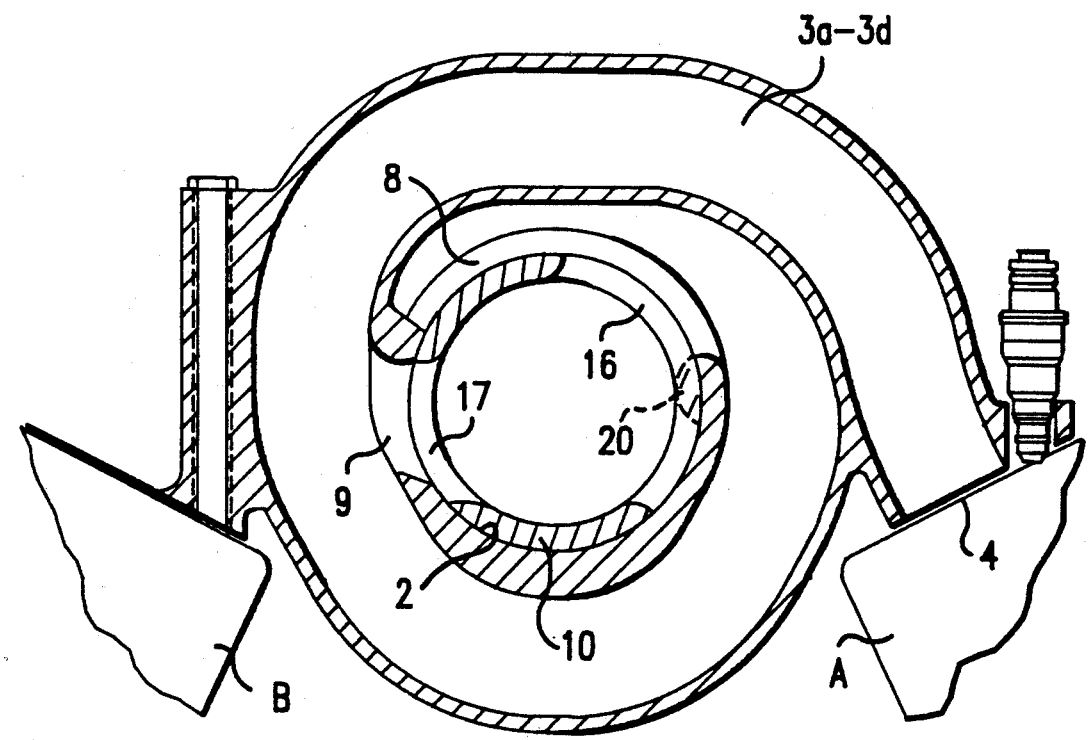
Figure 4:
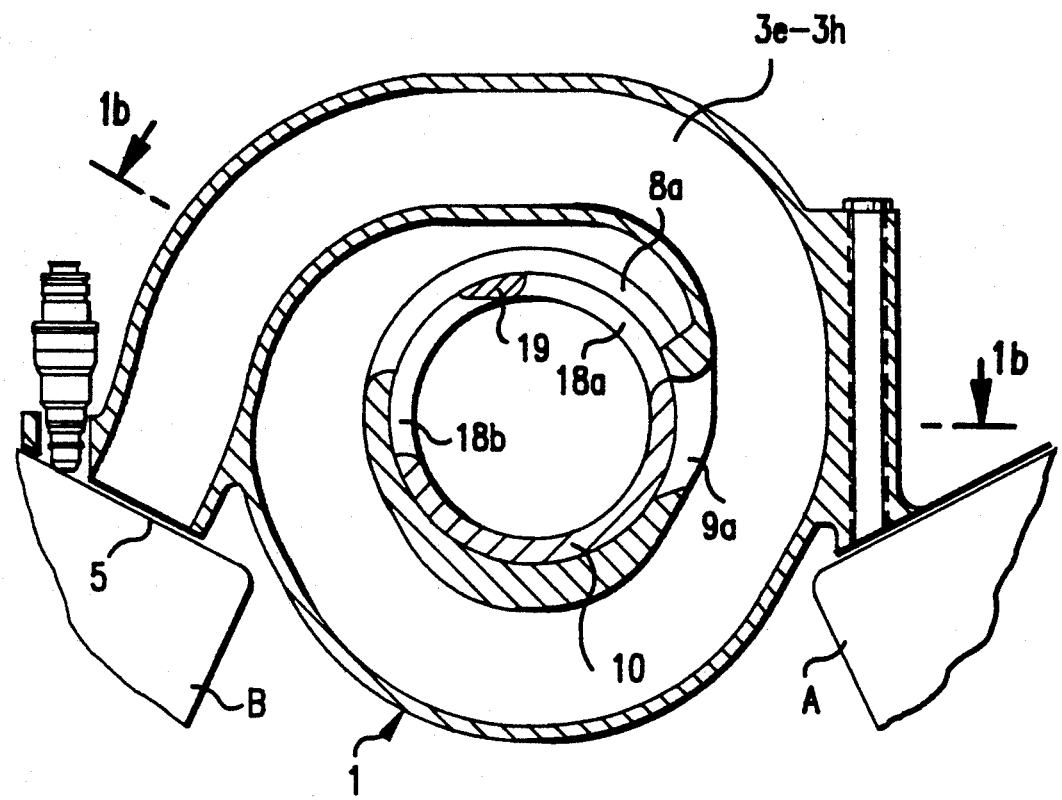
Figure 5:
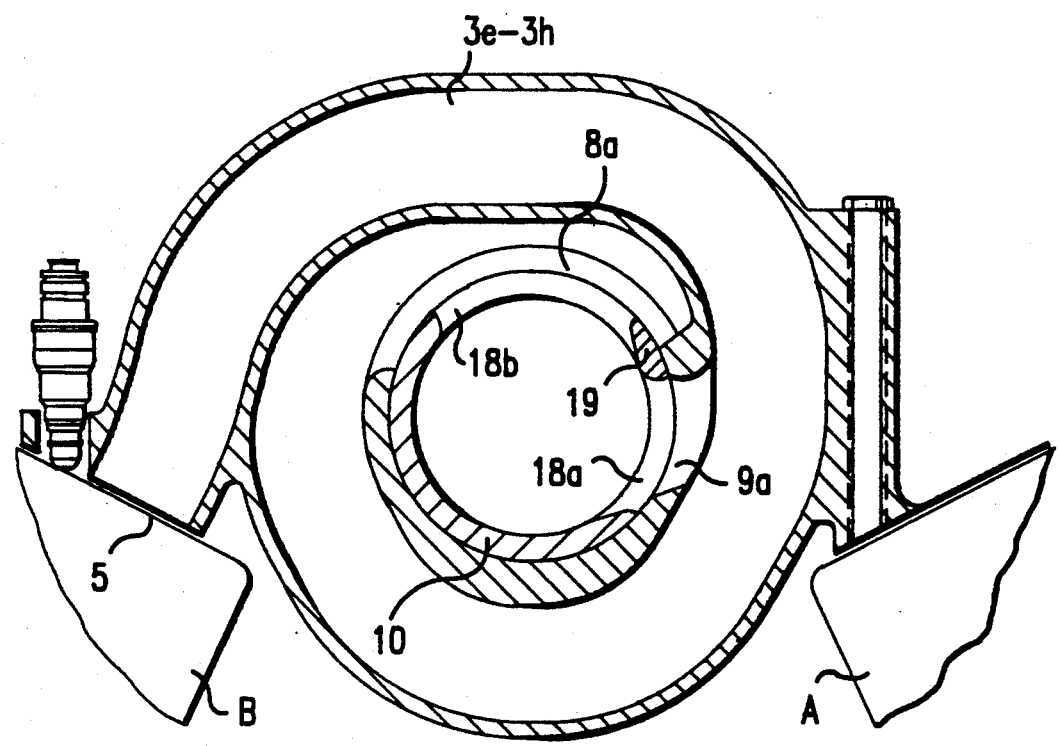

An embodiment of the invention is explained in greater detail, in the following, by means of the drawings, in which FIG. 1 shows a longitudinal section through a suction pipe arrangement for a V8 internal combustion engine, the rotary slide valve for the individual suction pipes of the one bank of cylinders being cut corresponding to line 1a—1a in FIG. 2 and that for the individual suction pipes of the other bank of cylinders being cut corresponding to the line 1b—1b in FIG. 4, FIG. 2 is a section along the line 2—2 in FIG. 1, the rotary slide valve being in its first position, in which the second openings of the first individual suction pipes are closed, FIG. 3 shows a section corresponding to FIG. 2, wherein the rotary slide valve is in its second position, in which the second openings of the first individual suction pipes are unblocked, FIG. 4 shows a section along the line 4—4 of FIG. 1, wherein the rotary slide valve is in the first position shown in FIG. 2 and the second openings of the second individual suction pipes are blocked, and FIG. 5 shows a section corresponding to FIG. 4 with the rotary slide valve in the second position, as in FIG. 3, in which said valve releases the second openings of the second individual suction pipes.

In the drawings, a suction pipe arrangement for a V8 internal combustion engine is shown, which has a cast housing 1 with a tubular intake manifold chamber 2 and individual suction pipes 3a to 3h leading to the individual cylinders. The first individual suction pipes 3a to 3d are assigned to the cylinders of the first bank A and the second individual suction pipes 3e to 3h are assigned to the cylinders of the second bank B, as is evident from FIGS. 2 to 5. The individual suction pipes are disposed next to one another in the longitudinal direction of the intake manifold chamber 2 and guided around this chamber, the first individual suction pipes 3a to 3d being arranged in the clockwise direction and the section individual suction pipes 3e to 3h being arranged in the counterclockwise direction. The first individual suction pipes 3a to 3d end in a flange 4, which is bolted to the cylinder head of cylinder bank A and the second individual suction pipes 3e to 3h end in a flange 5, which is bolted to the cylinder head of the cylinder bank B. For each individual suction pipe, a fuel injection valve 6 is mounted in the flanges 4 and 5.

In the wall 7 of the intake manifold chamber 2, two openings 8 and 9 are provided for the first individual suction pipes 3a to 3d and two openings 8a and 9a are provided for the second individual suction pipes 3e to 3h, which are disposed spaced apart at an angle. The first of the openings 8 or 8a is at the start of the individual suction pipe and the second opening 9 or 9a is approximately in the middle between the start and end of the individual suction pipe at flange 4 or 5. By these means, two different swing pipe lengths can be realized, namely a long swing pipe length for achieving a high torque in the lower to medium engine speed range of the internal combustion engine by blocking the second openings 8 and 9a, and a short swing pipe length for high power in the upper range of engine speeds, by releasing the second openings 9 and 9a. For this purpose, the intake manifold chamber 2 is constructed with a circular cross section and a tubular rotary slide valve 10, which extends essentially over the whole length of the intake manifold chamber 2, is disposed in this chamber. The rotary slide valve 10 is connected to a suction line 11 (FIG. 1), which is bolted to the face of the housing 1 and has a butterfly valve 12, which can be operated arbitrarily. The rotary slide valve 10 is closed by a face wall 13 at its end that is averted from the suction line 11. From the face wall 13, a shaft 14 extends to the outside, which is engaged by an operating element, which is not shown and with which rotary slide valve 10 can be rotated as a function of the operating parameters between a first and a second position. The rotary slide valve 10 is rotatably mounted in the housing 1 on bearings 15.

For each first individual suction pipe 3a to 3d, two control slits 16 and 17, which extend in the circumferential direction, are provided in the wall of the rotary slide valve 10. Of these, the control slit 16, in the first end position of the rotary slide valve 10, is in communication with the first opening 8, while the second opening 9 is covered by the wall of the rotary slide valve 10. For each second individual suction pipe 3e to 3h, a single control slit 18, which communicates with the first opening 8a in the first end position of the rotary slide valve 10 (FIG. 4), while the second opening 9a is covered, is provided in the wall of the rotary slide valve 10. The large length of the swing pipe is thus realized in this position of the rotary slide valve. When the rotary slide valve 10 is rotated in the clockwise direction into its second position, which is shown in FIGS. 3 and 5, the second control slit 17 communicates with the second opening 9 and the control slit 18 communicates with the second opening 9a. The first control slit 16 and the control slit 18 are, however, dimensioned, so that they also partially free the first opening 8 or 8a when the rotary slide valve is in the second position, even when the main stream (about 80%) enters through the second opening 9 or 9a into the individual suction pipe and the small swing pipe length is realized by these means. Owing to the fact that the cross section of the first opening is reduced to the same extent as the cross section of the second opening is enlarged, a reduction in the cross section is avoided when the rotary slide valve is switched over from the first to the second position.

Since the control slits 18 for the second individual suction pipes must be relatively long in order to achieve the same control times as for the first individual suction pipes, it is advisable, for reasons of strength, to divide these control slits in each case by a cross member 19, which extends in the axial direction, into two partial slits 18a, 18b, the cross member being disposed so that partial slit 18a corresponds in size to the second opening 9a. In the second position of the rotary slide valve (FIG. 5), the cross member 19 also contributes to making possible a trouble-free flow into the individual suction pipe 3e to 3h through the second opening 9a, since in this position (high power) an optimum flow is particularly important.

To achieve a higher strength and for reasons of symmetry, the first control slit 16 can also be divided into two partial slits with a cross member 20, which extends in the axial direction and is drawn by a broken line. This cross member should be placed, so that, in the second position of the rotary slide valve shown in FIG. 3, it does not reduce the flow cross section into the first opening 8. The shape of the cross member is selected so that, in the second position (FIG. 3), an optimum flow into the first opening 8 of the individual suction pipe 3a to 3d is achieved.

Through the different constructions shown of the control slits for the openings of the first and the second individual suction pipes, it becomes possible, despite the essentially mirror-image disposition of these openings, to realize equal control times and control cross sections for both groups of suction pipes 3a to 3d and 3e to 3h with a common rotary slide valve.

We claim:

1. Suction pipe arrangement for a multicylinder internal combustion engine with two banks of cylinders in V formation, with a tubular intake manifold chamber (2)

with first individual suction pipes (3a to 3d) leading to the cylinders of the first bank of cylinders (A) and with second individual suction pipes (3e to 3h) leading to the cylinders of the second bank of cylinders (B), which are arranged next to one another in the longitudinal direction of the intake manifold chamber (2), the first individual suction pipes (3a to 3d) extending in the clockwise direction and the second individual suction pipes (3e–3h) extending in the counterclockwise direction about the intake manifold chamber and being in communication with the intake manifold chamber (2) in each case by way of a first and a second opening (8, 8a or 9, 9a), which are disposed spaced apart at a given angle in the wall (7) of the intake manifold chamber (2) and of which the second opening (9, 9a) is controlled by a valve element, which, depending on the operating parameters, closes off the second opening to achieve a large swing pipe length and frees it to achieve a small swing pipe length, characterized in that (a) the intake manifold chamber (2) has a circular cross section and the valve element (1) is formed from a rotary slide valve, which is disposed in the intake manifold chamber, extends essentially over the whole length of this chamber and is connected rotatable between a first and a second position and to a suction line (11), (b) the two openings (8, 9) of the first individual suction pipes are disposed essentially in mirror image fashion to the two openings (8a, 9a) of the second individual suction pipes and (c) in the wall of the rotary slide valve (10), first and second control slits (16, 17) are provided for the openings (8, 9) of each first individual suction pipe (3a to 3d) and a common control slit (18) is provided for the openings (8a, 9a) of each second individual suction pipe (3e to 3h), the arrangement being made so that, in the first position of the rotary slide valve (10), the second opening (9 or 9a) of each individual suction pipe is closed off and the first opening (8 or 8a) is freed by the first control slit (16) or by the common control slit (18) respectively and, in the second position, the second control slits (17) free the second openings (9) of the first individual suction pipes (3a to 3d) completely and the first control slits (16) free the first openings (8) of the first individual suction pipes (3a to 3d) partially and the common control slits (18) free the second openings (9a) of the second individual suction pipes (3e to 3h) completely and the first openings (8a) partly.

2. The suction pipe arrangement of claim 1, characterized in that the common control slit (18) in each case is divided by a cross member (19) into two partial slits (18a, 18b), the cross member being disposed so that a partial slit (18a) corresponds to the size of the second opening (9a) and the free cross sections of the partial slits (18a and 18b) (FIG. 4) correspond to the cross section of the control slit (16) (FIG. 2), and the shape of the cross member being designed so that, in the second position of the rotary slide valve (10) (FIG. 5), the flow into the second opening (9a) is as free of eddies as possible.

3. The suction pipe arrangement of claim 1, characterized in that the first control slits (16) in each case are subdivided by a cross member (20) into two partial slits, the cross member (20) being disposed and constructed, so that, in the second position (FIG. 3) of the rotary slide valve (10), it lies in the wall region of the intake manifold chamber (2) and adjoins the adjacent edge of the opening (8) in such a manner as to favor the flow.

* * * * *